June 24, 1969     J. V. WALSH     3,451,714

VISOR

Original Filed Oct. 31, 1963

INVENTOR.
JAMES V. WALSH
BY
*Hauke & Hauke*
ATTORNEYS

United States Patent Office 3,451,714
Patented June 24, 1969

3,451,714
VISOR
James V. Walsh, 32762 Winona Court,
Garden City, Mich. 48135
Continuation of abandoned application Ser. No. 320,404,
Oct. 31, 1963. This application Aug. 5, 1966, Ser. No.
573,772
Int. Cl. B60j 3/02; E05d 15/00
U.S. Cl. 296—97                                 8 Claims

ABSTRACT OF THE DISCLOSURE

A visor for a vehicle including a sheet of foldable material folded along a line to form the body of the visor, hinge elements on each side of the line and spaced to form a continuous hinge bore, and a supported rod engaged in the hinge bore.

---

This application is a continuation application of my copending application Ser. No. 320,404, filed Oct. 31, 1963, now abandoned.

The present invention relates to accessories for automobiles and more particularly to an improved sun visor for automobiles and other vehicles.

Heretofore sun visors for automobiles and other vehicles have required rather complicated and, therefore, expansive mechanism to insure that the visor will remain in the selected position despite the vibrations and jolts incurred during the operation of the vehicle. Even with such mechanism, repeated use of the visor produces wear and eventually the visor will not remain in the desired position but will tend to fall to obstruct the view of the operator of the vehicle.

The present invention provides such a visor in which conventional mechanism has been completely eliminated. The result is a visor which can be much more economically manufactured than any visors heretofore used. The particular means provided for retaining the visor in the desired position in addition to being simply constructed and economically produced is also provided with wear compensating features so that even after repeated use the visor will remain in the selected position.

It is an object then of the present invention to reduce the manufacturing costs of visors for automobiles and the like by providing such a visor with simply and economically constructed position retaining means.

It is another object of the present invention to improve visors for automobiles and the like by providing such a visor with a position retaining means in which the effect of wear is substantially minimized.

Still further objects and advantages of the present invention will readily occur to one skilled in the art to which the invention pertains upon reference to the following drawings in which like reference characters refer to like parts throughout the several views and in which.

Figure 1:
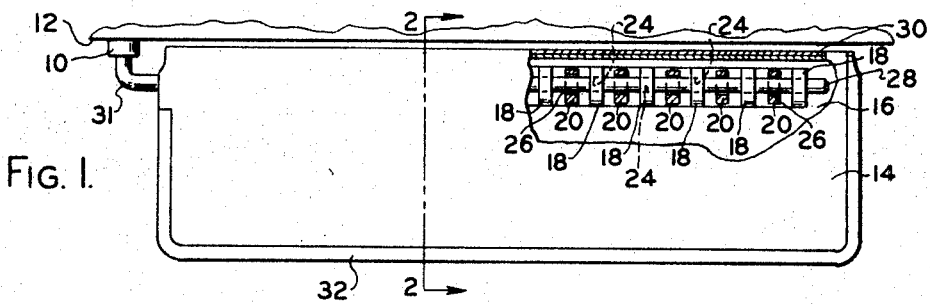
FIGURE 1 is an elevational view of one preferred visor of the present invention and in which portions are shown in section for purposes of clarity.

Now referring to the drawings for a more detailed description of the visor construction of the present invention several preferred embodiments are illustrated therein but each is intended to be secured in the appropriate position in a vehicle as shown in FIGURE 1 by a conventional pivotal connector element 10. The connector element 10 permits the visor to be pivoted about an axis substantially normal to the plane of the surface 12 to which the visor is attached. All of this being the conventional manner of attaching a visor to an automobile or other vehicle.

Figures 2, 4:
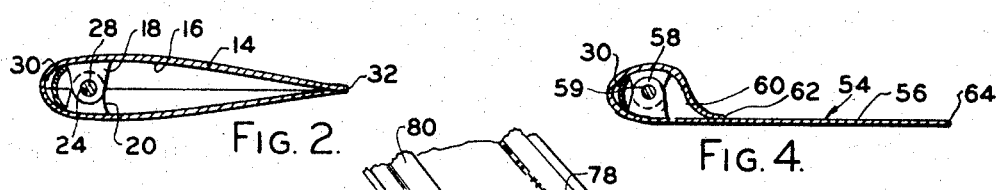
FIGURE 2 is a cross-sectional view taken substantially on line 2—2 of FIGURE 1.
FIGURE 4 is a view similar to FIGURE 2 but illustrating another preferred embodiment of the present invention.
Figures 3, 5:
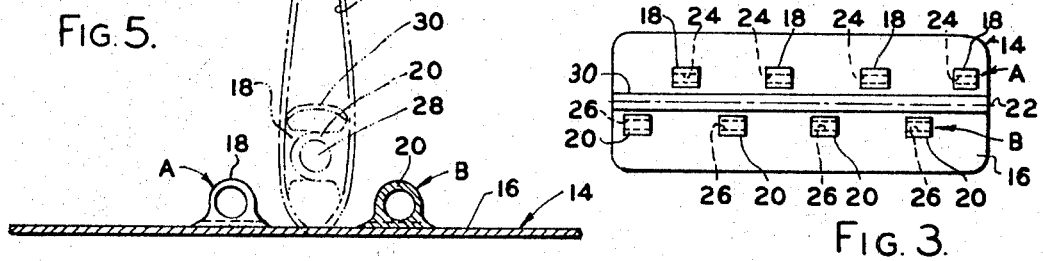
FIGURE 3 is a top plan view of the embodiment illustrated in FIGURE 1 but illustrating the visor at one stage in the assembly thereof.
FIGURE 5 is a fragmentary cross-sectional view of another preferred embodiment of the present invention illustrating the visor at several stages in the assembly thereof.

As illustrated in FIGURES 1-3, one preferred construction of the visor of the present invention comprises a sheet 14 of flexible material such as plastic or the like.

On one surface 16 of the sheet 14 as can best be seen in FIGURE 3, two rows A and B of spaced projections 18 and 20, respectively, are provided. The rows A and B are equally spaced from the longitudinal center line 22 of the sheet 14. The projections 18 and 20 are individually spaced within the rows A and B as shown so that between each pair of adjacent projections 18 in each row A there is sufficient spacing to receive a projection 20 from the row B as the flat sheet 14 is folded along the center line 22 to the position best seen in FIGURE 2.

Each of the projections 18 and 20 is provided with a center bore 24 and 26, respectively. The bores 24 of the projections 18 are aligned within the row A and the bores 26 of the projections 20 are aligned within the row B so that as the sheet 14 is folded to the position illustrated in FIGURES 1 and 2, the bores 24 of the row A and bores 26 of the row B align to form a single central passage.

A rod 28 is received by the passage formed by the bores 24 and 26 and is provided with a bent end portion 31 received by the connector element 10 as can best be seen in FIGURES 1-3.

In the preferred embodiment illustrated in FIGURES 1-3, an elongated resilient spring member 30 is inserted between the rows A and B so that upon folding of the sheet 14 and insertion of the rod 28 the spring member will urge the rows A and B to separate and thus will urge the projections 18 and 20 in opposite directions thereby clamping the rod 28 within the passage formed by the bores 24 and 26.

The free edges of the folded sheet 14 then can be sealed by any convenient means such as heat sealing, gluing, sewing or the like as shown at 32 in FIGURES 1 and 2 to form a finished visor.

It is apparent that the visor described above can be economically manufactured and readily assembled. Substantial economy has been achieved by eliminating much of the position retaining mechanism heretofore necessary in such visors. Although the frictional engagement between the rod 28 and the projections 18 and 20 will resist rotation of the visor on the rod 28 to prevent accidental movement of the visor, the particular construction described provides a visor which can be readily manually adjusted to the desired position. Further, the visor has the advantage that any wear caused by repeated use will only result in the bores 24 and 26 becoming larger. This will not affect the operation of the visor since when this occurs the spring member 30 will immediately urge the rows A and B farther apart and the rod 28 will still be securely clamped within the passage formed by the bores 24 and 26.

FIGURE 4 illustrates another preferred construction in which rows A and B of projections 58 and 60 are formed about a line which is parallel to but spaced from the longitudinal center line of the flat sheet 54 so that upon folding the sheet 54 for insertion of the rod 59 the longitudinal edges 62 and 64 of the folded sheet 54 do not meet. The edge 62 is then secured to the surface 56 of the sheet 54 by any convenient means such as heat sealing, gluing, sewing or the like to form a finished visor.

FIGURES 5–9 illustrate a number of methods of forming the projections 18 and 20 and it will be clear as these methods are described that other methods will be suitable as well. In FIGURE 5, the rows A and B of projections 18 and 20 are illustrated as being individually formed as by a molding process or the like and then being secured to the sheet 14 in the proper position by any suitable means. If the projections 18 and 20 are constructed of plastic or the like, for instance, simply gluing or heat sealing the projections 18 and 20 in place would be satisfactory.

The two sides of the sheet 14 may then be folded to the phantom line position as indicated, and the spring 30 could be positioned as shown opposite to rather than adjacent the center fold line, or in any position to tend to urge the halves of the visor apart.

Figures 7, 7A:
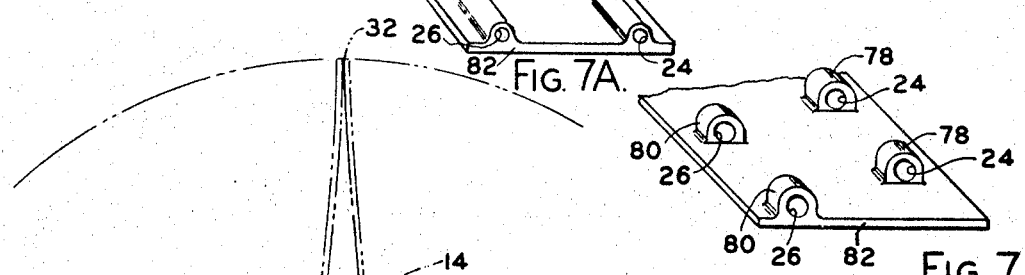
FIGURE 7 is a perspective view of a portion of the structure shown in FIGURE 6.
FIGURE 7A is a perspective veiw of the member shown in FIGURE 7 but in a preceding stage of manufacture.
Figure 6:
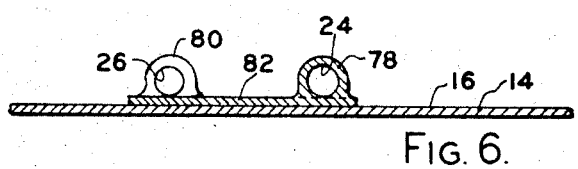
FIGURE 6 is a fragmentary cross-sectional view similar to FIGURE 5 but illustrating still another preferred embodiment of the present invention.

FIGURES 6, 7 and 7A illustrate another preferred method of constructing the visor of the present invention. In this method the projections 78 and 80 are formed integral with a base portion 82 extending between the rows of projections 78 and 80. The base portion 82 is then secured in the proper position on the sheet 14 by any suitable means such as by gluing or heat sealing. This method also has the advantage that the base portion 82 can be constructed of a resilient material to thereby eliminate the need for the spring member 30.

It is clear that the base portion 82 and projections 78 and 80 can be formed by one of several processes. An extrusion process can be used to initially produce a member as shown in FIGURE 7A, and then the spaces between the projections could be produced by a grinding or cutting operation to produce the member as shown in FIGURE 7. An injection molding process could be used in which case it would probably be necessary to subsequently form the bores 24 and 26.

Figure 9:
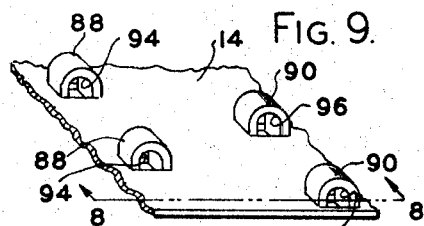
FIGURE 9 is a fragmentary perspective view of the embodiment illustrated in FIGURE 8.
Figure 8:
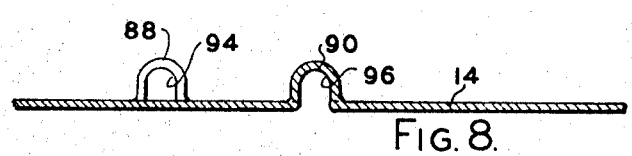
FIGURE 8 is a fragmentary cross-sectional view of yet another preferred embodiment taken substantially on the line 8—8 of FIGURE 9.

FIGURES 8 and 9 illustrate another preferred method of constructing the projections 88 and 90. In this method of construction, the projections 88 and 90 are formed from the material which makes up the sheet 14. The projections 88 and 90 can be stamped from the sheet 14 if a suitable material is used or they could be formed integrally with the sheet 14 by employing a molding process. Stamping the projections 88 and 90 from the sheet 14 has the advantage that no operation is necessary for forming the bores 94 and 96. It would be necessary for the sake of appearance in a visor formed in this manner to cover the visor with a suitable covering so that the openings produced by the projections 88 and 90 would be concealed.

It is apparent that by using a suitably resilient material for the sheet 14 the necessity of employing the spring member 30 could be eliminated.

It is also apparent that, in the visors which have been described, because the rod 28 locks the device in the assembled or finished position, the stresses along the edges of the visor are virtually eliminated so that securing the edges one to the other can be readily accomplished with a minimum of danger of the edges later separating. Further in the constructions which have been described, it is also advantageous to form the projections of a suitable resilient material and to form the diameters of the bores 24 and 26 slightly smaller than the diameter of the rod 28.

Furthermore, the member 82 as in FIGURE 6 could be secured to a conventional cardboard sheet which would form the visor proper.

It is also apparent that although I have described several embodiments of my invention, many other changes and modifications can be made without departing from the spirit of the invention as expressed by the appended claims.

I claim:
1. A visor for an automobile or other vehicle comprising:
   a sheet of foldable material folded along a fold line to form the body of said visor;
   first and second hinge elements positioned on said sheet spaced from said fold line on each side thereof, said hinge elements being spaced to cooperate to form a continuous hinge bore when said sheet is folded along said fold line;
   hinge pivot means cooperating with said continuous hinge bore, and support means for said hinge pivot means;
   each hinge element comprising at least one projection, said projections each being provided with a through bore extending on axes substantially parallel to the plane of said sheet, said projections being spaced to provide substantial axial alignment of said bores upon folding of said sheet along said fold line, thereby forming said continuous hinge bore, and said hinge pivot means comprising a rod received by said bores in aligned position so that said rod is rotatably retained by said bores; and
   a spring member being provided resiliently resisting folding of said sheet along said fold line whereby to urge said projections toward a position of non-alignment of said bores.

2. The visor of claim 1 wherein said spring member is positioned intermediate said projections.

3. The visor of claim 1 in which said projections are constructed of resilient material and said bores are formed with diameters slightly less than the diameter of said rod.

4. The visor of claim 1 wherein said spring member is substantially U-shaped and has an edge portion engaging said sheet on each side of said fold line when said sheet is in folded position.

5. A visor for an automobile or other vehicle comprising:
   a sheet of foldable material folded along a fold line to form the body of said visor;
   first and second hinge elements positioned on said sheet spaced from said fold line on each side thereof, said hinge elements being spaced to cooperate to form a continuous hinge bore when said sheet is folded along said fold line;
   hinge pivot means cooperating with said continuous hinge bore, and support means for said hinge pivot means;
   each hinge element comprising at least one projection, said projections each being provided with a through bore extending on axes substantially parallel to the plane of said sheet, said projections being spaced to provide substantial axial alignment of said bores upon folding of said sheet along said fold line, thereby forming said continuous hinge bore, and said hinge pivot means comprising a rod received by said bores in aligned position so that said rod is rotatably retained by said bores; and
   means urging said projections toward a position of non-alignment, said sheet being rectangular, said fold line being parallel to but spaced from the longitudinal center line of said sheet whereby to form a pair of spaced longitudinal edges and wherein means are provided securing one of said longitudinal edges to said sheet.

6. The visor as defined in claim 5 and in which
said projections are constructed of resilient material; and
said bores have diameters slightly less than the diameter of said rod whereby said rod is resiliently clamped to said projections.

7. A visor for an automobile or other vehicle comprising:
a sheet of foldable material folded along a fold line to form the body of said visor;
first and second hinge elements positioned on said sheet spaced from said fold line on each side thereof, said hinge elements being spaced to cooperate to form a continuous hinge bore when said sheet is folded along said fold line;
hinge pivot means cooperating with said continuous hinge bore, and support means for said hinge pivot means;
each hinge element comprising at least one projection, said projections each being provided with a through bore extending on axes substantially parallel to the plane of said sheet, said projections being spaced to provide substantial axial alignment of said bores upon folding of said sheet along said fold line, thereby forming said continuous hinge bore, and said hinge pivot means comprising a rod received by said bores in aligned position so that said rod is rotatably retained by said bores; and
means urging said projections toward a position of non-alignment, said fold line being positioned substantially in the longitudinal center line of said sheet whereby upon folding of said sheet pairs of adjacent three ends will be provided on three sides of said visor and means are provided securing said adjacent edges one to the other.

8. The visor as defined in claim 7 and in which
said projections are constructed of resilient material; and
said through bores have diameters slightly less than the diameter of said rod whereby said rod is resiliently clamped to said projections.

References Cited

UNITED STATES PATENTS 2,027,433    1/1936    Jacobs    296—97

FOREIGN PATENTS 508,896    2/1952    Belgium.

BENJAMIN HERSH, *Primary Examiner.*

J. A. PEKAR, *Assistant Examiner.*

U.S. Cl. X.R.

16—128